May 19, 1936.   M. W. KENNEY ET AL   2,041,353

SHOCKLESS MOUNTING

Filed March 7, 1934

Inventors:
Mahlon W. Kenney
Arthur R. Constantine
By:— Cox & Moore   attys.

Patented May 19, 1936

2,041,353

UNITED STATES PATENT OFFICE 2,041,353

SHOCKLESS MOUNTING

Mahlon W. Kenney, Chicago, and Arthur R. Constantine, River Forest, Ill., assignors to General Household Utilities Company, Chicago, Ill., a corporation of Delaware Application March 7, 1934, Serial No. 714,447

7 Claims. (Cl. 248—22)

Our invention relates in general to improved means for and method of supporting objects of any character and has more particular reference to the shockless and vibrationless suspension of devices wherein vibration, shocks and jars are apt to occur, the invention pertaining more particularly to the provision of resilient suspension means for motors and similar devices having moving parts and being especially applicable in the mounting of mechanism forming a part of a mechanical refrigerator wherein maximum noise suppression, to insure quiet operation, is of importance.

An important object of our present invention is to utilize the internal resilience of a loosely confined yielding material, specifically a rubber block, mounted in a confining housing, for the shockless and vibrationless suspension of a vibrating device, said resilient material in conjunction with its housing being arranged to absorb jars and the like which may be initiated in the device and prevent transmission of the same through the mounting to a base on which the device is mounted, said suspension being equally operable to absorb jars initiated in the base and thus prevent transmission of said jars to the supported device.

A further object is to utilize the radial expansibility of the yielding material in response to axially applied forces for shock absorbing purposes, the invention also including the novel suspension method inherent to the herein described device.

Among the other important objects of our invention is to provide an improved means for and method of resiliently mounting devices having a tendency to vibrate in operation whereby to absorb the vibration and provide for substantially noiseless operation; to provide a leg having a foot of yielding material adapted to absorb vibrations imparted to the leg by a vibrating device mounted thereon in order to prevent the vibrations from being transmitted to a base on which the leg is supported; to provide a shock-absorbing suspension comprising a body of suitable resilient material enclosed in a relatively rigid casing into which the resilient body loosely fits and into which said body may expand to snugly fit therein when the weight of the supported object is applied to the suspension; to provide a resilient suspension of the character mentioned including a body of yielding material in which an arm on the suspended object may extend whereby the weight of the object is supported on said resilient body and an enclosing shell into which the body may expand and snugly fit under the influence of the weight of the supported object; to provide a suspension device comprising an annular element of rubber-like material adapted to fit loosely into a cylindrical casing and having a central depression adapted to receive a portion of the supported object; and to provide a suspension device comprising an annular element of rubber-like material adapted to fit loosely into a cylindrical casing and having a central depression adapted to receive a portion of the supported object, said annular element being arranged to expand into and snugly fit said casing under the influence of the weight of the supported object whereby said weight is transmitted at least in part radially within and absorbed by the radial compression of said annular element; a still further object being to form the annular element as a sleeve-like member having a portion forming a diaphragm or partition extending within the sleeve between the exposed ends thereof in a plane substantially normal to the axis of the sleeve, said partition being adapted to yieldingly receive the weight of the supported object.

Yet another object is to provide a resilient mounting which is effective to support and hold the supported device in place securely so that the same may be shipped without additional holding means.

Another important object is to provide a substantially noiseless refrigerator having an operating element, specifically a compressor, in which vibration is likely to develop when the element is operating with a shock absorbing suspension for the unit to absorb vibration initiating in the unit and prevent transmission thereof to associated apparatus, a further object being at least partially to absorb shocks and jars, such as may be set up in the refrigerator by careless handling, and prevent the same from reaching the operating element.

Another object is to provide a shock absorbing suspension which will permit a limited amount of sidewise play in a direction radially of an axis in the direction of which the weight of a supported object is applied on the suspension.

Numerous other objects, inherent functions and advantages of the invention will be apparent to those familiar with the art of shockless suspension as the invention is understood from the following description which, taken in connection with the accompanying drawing discloses a preferred embodiment of the invention.

Referring to the drawing.

Figure 1:
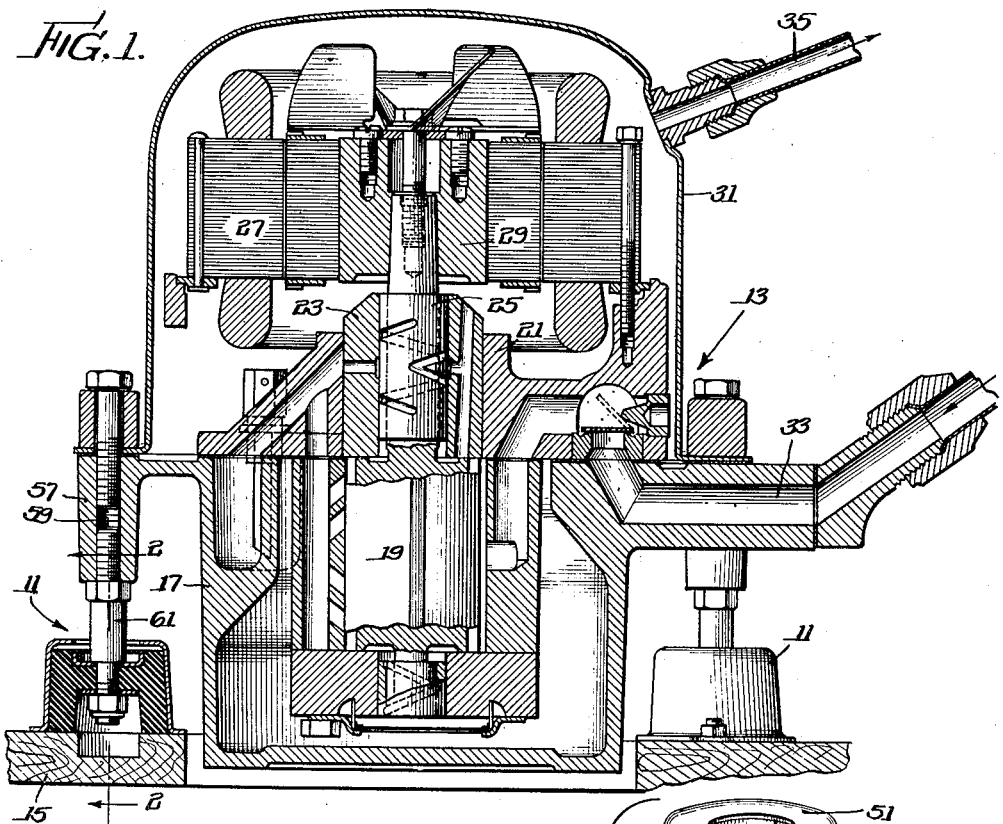
Figure 1 is a vertical section taken through a motor-condenser unit adapted for use in domestic refrigerators, said unit being shown supported by a suspension means embodying our present invention.
Figure 2:
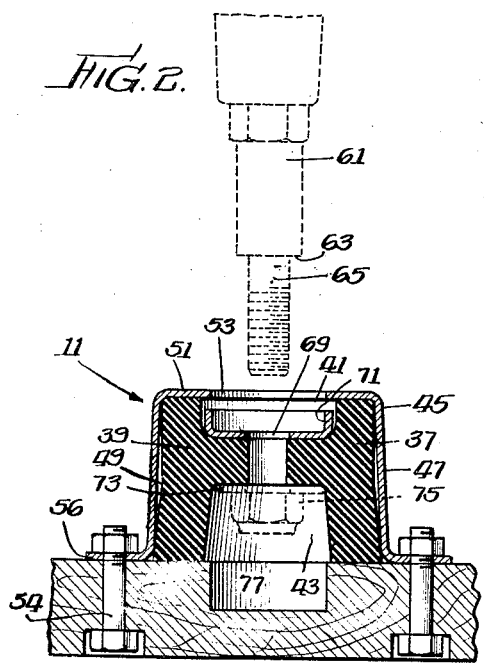
Figure 2 is an enlarged cross-sectional view of the resilient suspension means, the parts being shown in their relative positions prior to the application of the weight of the supported object.
Figure 3:
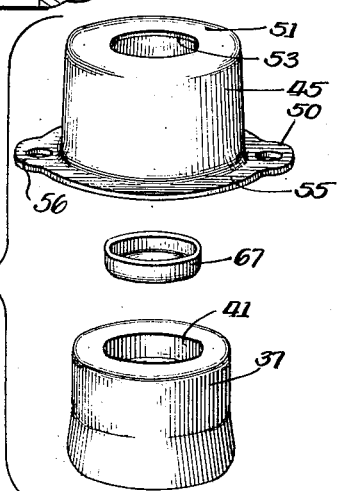
Figure 3 is an exploded perspective view of the several elements forming the suspension device.

To illustrate our invention, we have shown on the drawing a resilient shock absorbing suspension 11 for a device 13 whereby to prevent the transmission of jars which may be initiated in the device, through the mounting 11 to a support 15 on which the device is mounted, as well as to prevent the transmission of shocks, which may be initiated in the support 15, through the mounting to the supported device 13.

Our present invention may, of course, be employed for the shockless support of any object, but we propose our invention more particularly for the support of vibrating devices, such as pumps, motors and others having moving parts and which therefore are likely to vibrate, the invention being especially applicable to the support of devices of the character mentioned, which are furnished for use under conditions necessitating substantially noiseless operation. The specific application intended for our invention being the support of motors, pumps, and compressors for domestic use, more particularly the moving elements of a domestic refrigerating system.

To this end we have shown a plurality of resilient suspension devices 11 embodying our present invention as applied in supporting a sealed motor-compressor unit of a type adapted specifically for use in a refrigerating system of the so-called compression expansion type, such as is illustrated and described in detail in our copending application for Letters Patent of the United States, Serial No. 734,076, filed the 7th day of July, 1934. The unit 13 comprises a casing 17 forming a compressor housing containing a rotary compressor element 19 journaled in the housing. The housing 17 carries a bearing plate 21 forming a journal 23, in which a shaft 25, drivingly associated with the rotating element 19, is journaled. The plate 21 also supports a stationary portion 27 of a motor, the movable portion 29 of which is drivingly connected with the shaft 25. The casing 17 also carries a dome-like closure 31 for the motor, said dome-like closure, with the casing 17, forming a fluid-tight housing for the motor-compressor unit, suitable power leads being provided for delivering a power medium to the motor from an external source. The casing 17 is provided with an inlet 33 for the compressor, through which the medium to be compressed may be drawn into the casing and delivered at the suction side of the compressor. The compressor discharges into the dome-like casing 31, from whence the compressed medium may be discharged from the unit through a suitable outlet 35 formed in the dome. We do not claim herein the details of the mechanism within the housing portions 17 and 31 nor the details of said housing portions, since the same form the subject matter of our copending application for Letters Patent of the United States, filed the 7th day of July, 1934, Serial No. 734,076.

Devices of this general character are likely to develop considerable vibration due to the movement of the operating parts and even where great care is taken to balance the moving parts in order to minimize vibration, appreciable vibration is apt to be developed in the device 13 during operation, particularly if the device is operated at high speed. In order to minimize the undesirable effects of any vibration which may be initiated in the device 13 during its operation, we have provided a shockless mounting for the unit comprising a body 37 of resilient material, which may be supported directly on the base 15 or otherwise attached thereto. The body 37 is preferably formed as substantially a cylindrical element having a preferably integral centrally perforated diaphragm, web or partition 39 formed in the body intermediate its ends, affording a relatively shallow depression or socket 41 at one end and a relatively larger pocket 43 at the other, said pockets being separated by the diaphragm 39. The outer walls of the element 37 are preferably cylindrical at the end opposite the depression 41 and taper outwardly in a substantially conical fashion at the end opposite the socket pocket 43. The unit 13 is or may be suspended on one or more elements 37, the weight of the unit being applied to the element 37 at the diaphragm 39. Under the influence of the applied weight, the diaphragm yields in an axial direction and causes the outer walls of the element 37 to bulge outwardly in a radial direction when the element is squeezed against the support 15 by the application of the weight of the supported device. In order to protect the resilient element 37 from damage and also to assist in the supporting function we enclose it in a shell or housing 45 preferably having a conical body portion 47 shaped to snugly receive the element 37 at its opposite ends while leaving a space 49 between the shell and the wall surfaces of the element 37 intermediate the ends thereof. The shell 45 has an inwardly extending flange 51 at one end adapted to overlie the annular end surfaces of the element, said flange 51 defining a central opening 53 through which access may be had to the socket 41. At its opposite end, the shell 45 is provided with an outwardly extending peripheral flange 55, adapted to be secured upon the support 15. The casing 45 may be anchored to the support 15 by suitable fastening devices, such as the bolts 54, engaging ears 56 formed on the flange 55 and fastened to the support 15.

In order to provide for most conveniently applying the weight of the supported unit on the diaphragm 39, the casing 17 is or may be formed with a sleeve 57 having a threaded opening 59, one end of which is adapted to threadingly receive a leg 61, the opposite end of which is provided with a shoulder 63 and a threaded portion 65, adapted for insertion through the central perforation of the diaphragm 39. When so inserted, the shoulder 63 may rest upon and be supported by the diaphragm surface forming the bottom of the socket 41. We prefer, however, to provide a washer 67 between the shoulder 63 and the diaphragm in order to prevent the shoulder 63 from injuring the diaphragm material and to spread the applied weight over the entire available diaphragm surface, said washer 67 having a central perforation 69 to receive the threaded portion 65 and extending outwardly to the sides of the socket 41 and being formed with a peripheral flange 71 extending adjacent the sides of the socket. The flange 71 is of a size to underlie the flange 51 of the shell 45 in order to provide a limiting stop for relative movement of the leg with respect to the shell in one direction. The end of the threaded portion 65 is adapted to project into the pocket 43 and is secured in place by means of a washer 73 and a holding nut 75 which may be threaded on the projecting end of the shank 65 and tightened thereon sufficiently to secure the diaphragm 39 snugly between the washers 71 and 73. When the weight of the supported object is applied as aforesaid, the element 37 will be compressed in an axial direction within the casing 45 so that the end of the element will leave contact with the flange 51 as shown in Fig. 1, while the side walls of the element will be expanded radially into snug contact with the inner surfaces of the casing portions 47. The supported weight is thus carried in part axially and in part by the radial compression of the resilient element 37 against the sides of the casing 45. The lateral expansion of the walls of the element 37 into the shell causes a frictional engagement which is greater at the lower portions of the shell than at the upper portions, and this frictional engagement tends to hold the element in the shell 47 against axial shifting in either direction therein, while readily permitting a slight amount of resiliently controlled sidewise movement of the leg 61 in any radial direction because of the relatively light pressure between the walls of the element and the casing in the upper parts opposite the web 39. In conjunction with the conical configuration of the walls of the shell, the frictional engagement of the compressed element 39 with the inner tapered walls of the shell secures the member 37 firmly against the base so that additional clamping or fastening means is not required to hold the device on its base, as for instance during transportation. It is preferable also to form a socket 77 in the support 15 opposite the pocket 43 in order to receive the nut 75 without interference throughout the entire range of its supported movement, it being understood that considerable axial movement of the member 61 is permitted by the mounting under the influence of excessive shocks.

It is thought that the invention and numerous of its attendant advantages will be understood from the foregoing description and it is obvious that numerous changes may be made in the form, construction, and arrangement of the several parts without departing from the spirit or scope of our invention or sacrificing any of its attendant advantages; the forms herein described being preferred embodiments for the purpose of illustrating our invention.

Having thus described our invention, what we claim as new and desire to secure by Letters Patent is:

1. A shockless mounting comprising an element of resilient material having a tubular portion, the outer surfaces of which are necked inwardly intermediate the opposed ends of the tubular portion and an integral web within the tubular portion opposite said inwardly necked portion in position to receive the weight of an object to be supported, and a substantially rigid shell enclosing the sides of said tubular portion and normally affording a space between said inwardly necked portion and the shell whereby when the weight of the supported object is applied on said web in the direction of the axis of the tubular portion, the inwardly necked portion of said tubular portion may expand radially outwardly within said shell.

2. A shockless mounting comprising a substantially tubular element of resilient material having an inner integral web extending in a plane substantially normal to the axis of said element and defining a socket in an end of the element on one side of said web in position to receive the weight of an object supported on said mounting, and a substantially rigid shell enclosing the sides of said element, and having portions overlying at least the margin of said socket in position to engage and limit movement away from said socket of an object supported therein.

3. A shockless mounting for resiliently carrying the weight of an object to be supported upon a frame or base, said mounting comprising a tubular element of resilient material adapted to rest on one end on said frame, a sheet metal shell enclosing said element and having flanged means at one end adapted to be fastened to said frame, said shell having flanged means adapted to overlie a portion of said tubular element and retain the same on said frame, and said tubular element being formed with a seat in its end facing away from the frame and adapted to receive and support the weight of an object carried thereby.

4. A shockless mounting for resiliently carrying the weight of an object to be supported upon a frame or base, said mounting comprising a tubular element of resilient material adapted to rest on one end on said frame, a sheet metal shell enclosing said element and having flanged means at one end adapted to be fastened to said frame, said shell having flanged means adapted to overlie a portion of said tubular element and retain the same on said frame, said tubular element having an internal web intermediate the opposed ends thereof and defining a socket forming a seat facing away from said frame and in which an object to be supported may be mounted.

5. A shockless mounting for resiliently carrying the weight of an object to be supported upon a frame or base, said mounting comprising a tubular element of resilient material adapted to rest on one end on said frame, a sheet metal shell enclosing said element and having flanged means at one end adapted to be fastened to said frame, said shell having flanged means adapted to overlie a portion of said tubular element and retain the same on said frame, said tubular element having an integral internal web intermediate the opposed ends thereof defining sockets, one of which faces towards said frame and the other of which faces away from the frame and is adapted to receive and yieldingly support an object and resiliently transfer the weight thereof to said frame, said web having a perforation to receive a part of the supported object within said socket facing the frame so that holding means, enclosed entirely within the spaces defined by said frame facing socket and said frame, may be assembled for the purpose of retaining the supported object on the resilient mounting.

6. A shockless mounting comprising a tubular element of resilient material adapted to rest on one end on a frame or base, a sheet metal shell enclosing said element and having flanged means at one end adapted to be fastened on said frame, said shell having flanged means at its other end and adapted to overlie a portion of said tubular element and retain the same on said frame, said tubular element being formed with an internal web intermediate the opposed ends thereof and defining a socket forming a seat in its end facing away from said frame, said web being perforated, and a leg carried in said mounting, said leg having a shoulder resting in said socket and a projection extending in the perforation of said web.

7. A shockless mounting comprising a tubular element of resilient material adapted to rest on one end on a frame or base, a sheet metal shell enclosing said element and having flanged means at one end adapted to be fastened on said frame, said shell having flanged means at its other end and adapted to overlie a portion of said tubular element and retain the same on said frame, said tubular element being formed with an internal web intermediate the opposed ends thereof and defining a socket forming a seat in its end facing away from said frame, said web being perforated, and a leg carried in said mounting, said leg having a shoulder resting in said socket and a projection, extending in the perforation of said web, threaded to receive a fastening nut on the side of said web opposite from said shoulder to hold the parts in place.

MAHLON W. KENNEY.
ARTHUR R. CONSTANTINE.